United States Patent [19]
Allison et al.

[11] Patent Number: 5,575,417
[45] Date of Patent: Nov. 19, 1996

[54] SOLID STATE MICROWAVE INTEGRATED CIRCUIT RF INSULATOR-ENCAPSULATED CONTACT INSTALLATION AND REMOVAL PROCESSES

[75] Inventors: Robert C. Allison, Rancho Palos Verdes; Jonathan W. Chan, La Puente; Garrett I. Kurogi, Lakewood; Brian C. Semmelroth, Huntington Beach; James C. Tonder, Manhattan Beach; Kenneth S. Varon, Palos Verdes Estates, all of Calif.

[73] Assignee: Hughes Aircraft Company, Los Angeles, Calif.

[21] Appl. No.: 381,043

[22] Filed: Jan. 31, 1995

[51] Int. Cl.⁶ .................................................... B23K 1/00
[52] U.S. Cl. ........................ 228/119; 228/118; 228/179.1
[58] Field of Search .................................... 228/118, 119, 228/179.1, 191, 223, 264; 257/276, 728, 779

[56] References Cited

U.S. PATENT DOCUMENTS

| | | | |
|---|---|---|---|
| 3,665,367 | 5/1972 | Keller et al. | 439/866 |
| 4,641,140 | 2/1987 | Heckaman et al. | 342/371 |
| 5,406,122 | 4/1995 | Wong et al. | 257/753 |

*Primary Examiner*—Samuel M. Heinrich
*Attorney, Agent, or Firm*—Leonard A. Alkov; Wanda K. Denson-Low

[57] ABSTRACT

Apparatus and processes for desoldering and soldering an insulator-encapsulated contact using a focused heat source and thermal choke in the form of a soldering iron tip and a contact moat. The desoldering and removal process includes the following steps. Securing the housing to minimize movement thereof. Heating a soldering iron to approximately 825° C. Tinning the tip of the soldering iron with solder and flux. Engaging the contact from the rear using an extraction tool. Disposing flux on the solder joint. Contacting the soldering iron with the contact. Disposing the soldering iron in the moat while outward pressure is exerted with an extraction tool. After a predetermined delay, using the extraction tool to vacuum out the contact, while simultaneously removing the soldering iron and pushing out the contact, whereafter the contact is desoldered and seated in the extraction tool. Removing the contact from the extraction tool and removing the tool from the housing. The soldering or installation process comprises the following steps. Preparing a tinned contact for installation by surrounding its contact pin with teflon sleeves. Disposing flux in a central through hole in the housing. Disposing flux on the solder of the contact. Inserting the contact into the central through hole until one teflon sleeve is engaged therein. Heating a soldering iron to approximately 825° C. Tinning the tip of the soldering iron with solder and flux. Disposing the soldering iron on the contact and pressing the contact into the central through hole. Bottoming out the contact and leaving the soldering iron on the joint for a predetermined time period. Removing the soldering iron and examining the solder joint. Cleaning the solder joint and housing prior to removing the sleeves.

8 Claims, 5 Drawing Sheets

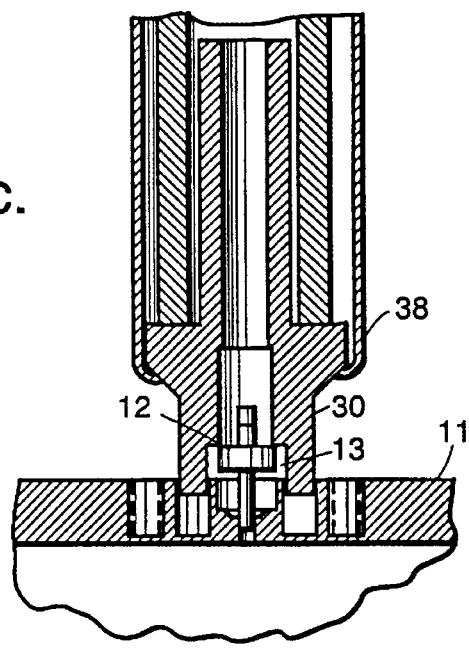
FIG. 5c.
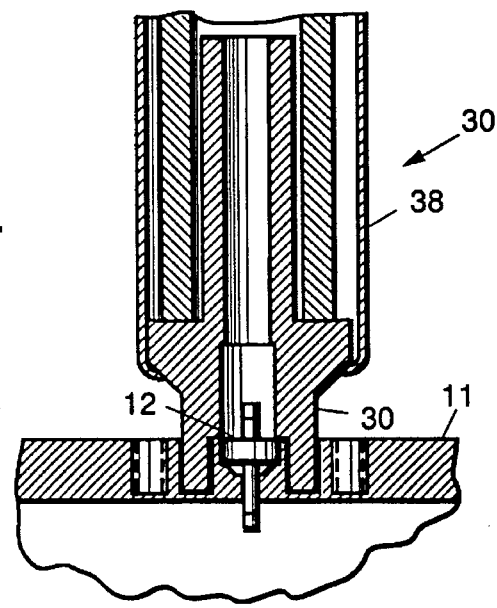
FIG. 5d.
FIG. 5e.
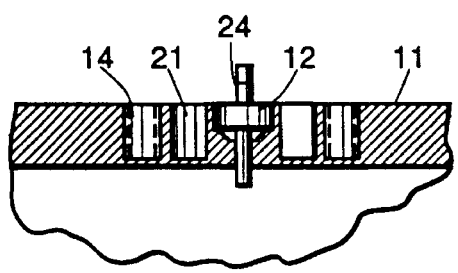
FIG. 5f.
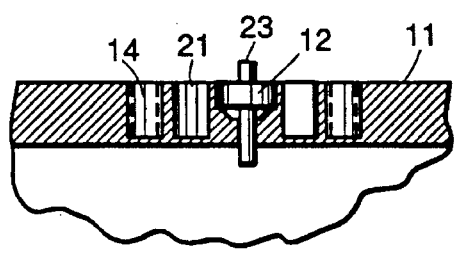

SOLID STATE MICROWAVE INTEGRATED CIRCUIT RF INSULATOR-ENCAPSULATED CONTACT INSTALLATION AND REMOVAL PROCESSES

BACKGROUND

The present invention relates generally to solid state microwave integrated circuits, and more particularly, to apparatus and methods for installing and removing insulator-encapsulated contacts employed in such microwave integrated circuits.

Solid state microwave integrated circuits typically employ insulator-encapsulated contacts, such as 50 ohm feedthrough contacts. Should a contact need to be replaced due to damage or hermeticity failure, the conventional process calls for disassembly of the unit, i.e., removal of all internal electronics such as substrates, mixers, ribbons, wire bonds, and other components. Some substrates are mounted to a housing on carriers, others are bonded to the housing, in which case bonding removal is necessary. The bare housing is then placed on a hot plate and heated to a temperature of 250° C., which is around 60° C. higher than the reflow, or melting temperature of 186° C. The contact in question is replaced, the housing cleaned, substrates reinstalled, or rebonded, and gap welding is done before the unit is ready for leak test.

The disadvantages of this conventional process include the following. It is time-consuming and labor intensive. It takes a minimum of 4 hours from start to finish, and in some cases longer, depending upon the complexity of the circuit. Many times multiple operators are involved before the process is completed. The conventional process introduces unnecessary thermal shock to solder joints. Most MICs have more than one contact, and heating the entire assembly causes all solder joints to reflow, regardless of whether it is necessary, therefore increasing the likelihood of reflowing an otherwise good solder joint. Finally, should a device fail a post-rework hermeticity test, the replacement process must be repeated.

Therefore it is an objective of the present invention to provide for improved apparatus and methods for installing and removing insulator-encapsulated contacts, such as 50 ohm feedthrough contacts, and the like, employed in such microwave integrated circuits.

SUMMARY OF THE INVENTION

In order to meet the above and other objectives, the present invention provides for apparatus and methods of desoldering (removing) and soldering (installing) insulator-encapsulated contacts using a focused heat source and thermal choke in the form of a soldering iron tip and a contact moat. Insulator-encapsulated contacts are commonly used as interconnecting devices and are soldered to a housing to provide hermeticity. Should a contact need to be replaced the solder has to be reflowed for disengagement which necessitates a temperature elevation beyond the normal operating temperature range of internal electronic components. The present invention allows the contact solder joint to reflow without disassembling the device.

The present invention employs the use of a contact moat, a custom soldering tip, and an extraction tool. These three tools are used in conjunction with the present removal and installation processes in order to facilitate desoldering and resoldering of insulator-encapsulated contacts.

More specifically, the process for desoldering or removing an insulator-encapsulated contact secured in a housing, includes the following steps. Securing the housing to minimize movement of the housing. Heating a soldering iron is heated to approximately 825° C. Tinning the tip of the soldering iron with solder and flux. Engaging the contact from the rear using an extraction tool. Disposing flux on the solder joint. Placing the soldering iron in contact with the contact. Disposing the soldering iron in the moat while outward pressure is exerted with an extraction tool. After a predetermined delay, using the extraction tool to vacuum out the contact, while simultaneously removing the soldering iron and pushing out the contact, whereafter the contact is desoldered and seated in the extraction tool. Removing the contact from the extraction tool and removing the tool from the housing.

The process for installing or soldering an insulator-encapsulated contact into a housing comprises the following steps. Preparing a tinned contact for installation by surrounding its contact pin with teflon sleeves. Disposing flux in a contact hole in the housing. Disposing flux on the solder of the contact. Inserting the contact into the hole until one teflon sleeve is engaged in the thru hole. Heating a soldering iron to approximately 825° C. Tinning the tip of the soldering iron with solder and flux. Disposing the soldering iron on the contact and pressing the contact into the hole in the housing. Bottoming out the contact and leaving the soldering iron on the joint for a predetermined time period. Removing the soldering iron and examining the joint. Cleaning the solder joint and housing prior to removing the sleeves.

The present invention reduces the rework cycle of a defective device while retaining all the advantages and improving the disadvantages of the process heretofore employed by the assignee of the present invention. Advantages of the current process are that no specialized certification for the operator is required. Any assembler qualified for soldering is qualified to use this invention. Gold plating on the contact can be protected by teflon sleeves currently in use and no new sleeves need to be developed. The sleeves also serve to allow solder touch-up and prevent contacts from being shorted by the solder, and no burn or scorch marks are inflicted on the housing since there is no localized high intensity heat applied.

Additional advantages are that the contact can be removed and reinstalled in an extremely short time. The entire cycle can be completed in less than five minutes. Parts can remain in the housing during rework, thereby eliminating any possibility of damage during handling. Rework can be done on an individual contact without heating the entire housing. This eliminates the danger of reflowing otherwise good solder joints. No preheating is required, which enhances operation safety. Hermeticity testing is greatly simplified since only the differential is examined. Repeated rework may be done to perfect a solder joint. Device testing need not be interrupted should a contact be damaged. Replacement may be done by qualified test technicians.

Microwave integrated circuits (MICs) are used in many development programs at the assignee of the present invention, especially those using microwave receivers. The conventional process takes 4 hours to replace a contact, which includes substrate removal, housing preparation, contact removal and replacement, substrate reinstallation, and gap welding. This 4-hour process is used by all known MIC manufacturers. The present invention reduces the rework cycle to five minutes, which includes cleaning the housing after rework, which provides a cost saving of about 98 percent.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2a is a cross-sectional view of the conventional hole pattern of FIG. 1a taken along the lines 2a—2a;

FIGS. 5a–5f illustrate an installation or soldering process in accordance with the principles of the present invention;

DETAILED DESCRIPTION

Figure 1A:
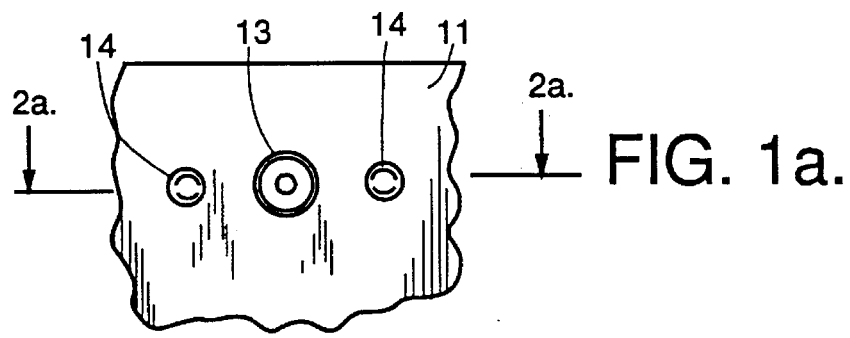
FIG. 1a shows a conventional hole pattern for an insulator-encapsulated contact.
Figure 4A:
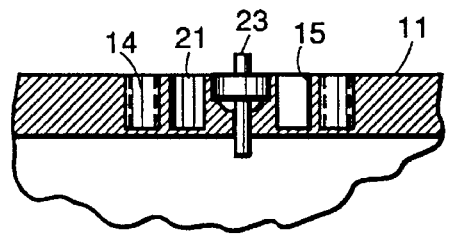
FIGS. 4a–4f illustrate a removal or desoldering process in accordance with the principles of the present invention.
Figure 4B:
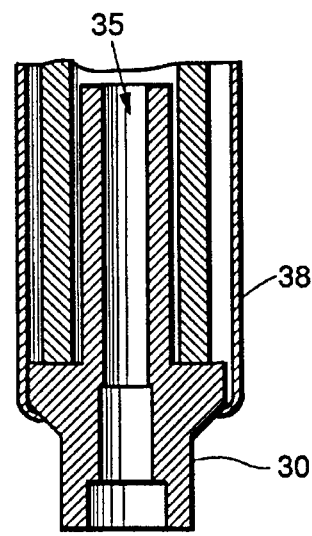
Figure 4B:
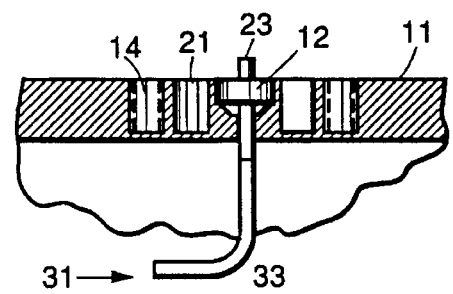

Referring to the drawing figures, FIG. 1a shows a conventional hole pattern 10 formed in a housing 11 for securing an insulator-encapsulated contact 12 (FIG. 4b). The conventional hole pattern 10 includes a central through hole 13 that receives the contact 12 and two threaded holes 14 for securing a connector (not shown) that mates with the contact 12. FIG. 2a shows a cross-sectional view of the conventional hole pattern 10 shown in FIG. 1.

Figure 1B:
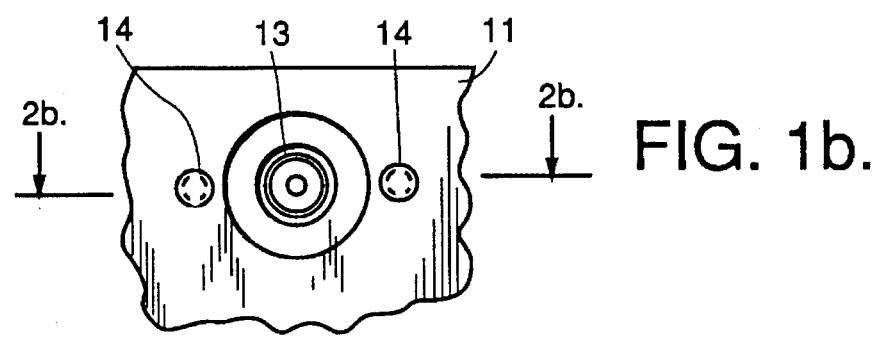
FIG. 1b shows a moated hole pattern for an insulator-encapsulated contact in accordance with the principles of the present invention.
Figure 2A:
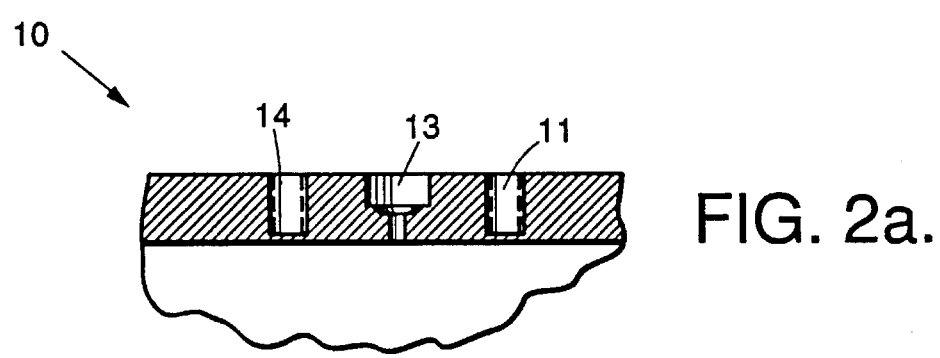
Figure 2B:
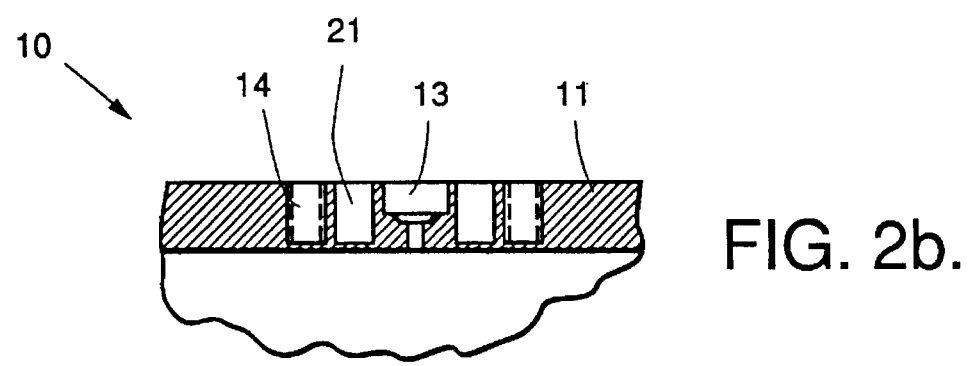
FIG. 2b is a cross-sectional view of the moated hole pattern of FIG. 1b taken along the lines 2b—2b.

FIG. 1b shows a moated hole pattern 20 formed in a housing 11 for securing the insulator-encapsulated contact 12 in accordance with the principles of the present invention. As can be seen in FIG. 1b, a contact moat 21 is formed around the central through hole 13. The two threaded holes 14 are the same as in the conventional hole pattern 10. FIG. 2b shows a cross-sectional view of the moated hole pattern 20 shown in FIG. 1b.

In order to melt solder that is integral with an installed insulator-encapsulated contact 12 without elevating the temperature of the housing 11, the soldered contact 12 must be heated locally where the rate at which heat transferred into the solder joint 15 exceeds that which is conducted to the remainder of the housing 11.

The present invention provides for apparatus and methods (as, respectively, shown in FIGS. 4 and 5) for desoldering (removing) and soldering (installing) insulator-encapsulated contacts 12 from and into a housing 11, respectively, using a focused heat source 30 (FIG. 3) and thermal choke in the form of a soldering iron tip 30 and the contact moat 21, and for contact removal, an extraction tool 31 (FIG. 4b). The tools are used in conjunction with the removal and installation processes to desolder and solder the contacts 12.

The contact moat 21 is cut in the housing 11 around the central through hole 13 and between the threaded holes 14, as shown in FIG. 1b. The threaded holes 14 are provided to secure the connector and do not play a role in the present processes, other than setting a boundary for the moat 21. The moat 21 serves to break and interrupt the thermal path by which heat conducts to other parts of the housing 11. By using the moat 21, more heat is retained in the solder joint 15, thereby melting the solder prior to overheating the housing 11.

Figure 3:
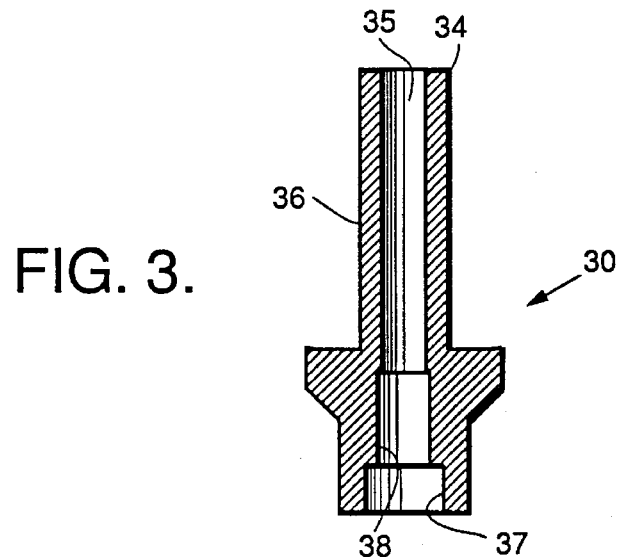
FIG. 3 illustrates a cross-sectional view of a soldering tip employed in the present invention.

FIG. 3 illustrates a cross-sectional view of the tip 30 employed in the present invention. The tip 30 is comprised of a metal body 34 having an axial hole 35 formed therein that forms a vacuum channel. An elongated shaft 36 is formed at an upper portion of the body 34 that inserts into a soldering iron 38 (FIG. 4b). The lower portion of the body 34 has a larger outer diameter that is chamfered to reduce the outer diameter of the tip 30. Two counterbored holes 37, 38 are provided at the tip 30 that insert into the moat 21 and that are used to secure sleeves 24 (FIG. 5a) during installation that is disposed around a contact pin 23 (FIG. 4a). Since conduction is the most efficient method of heat transfer, it is crucial to insure that conductive surfaces contact the moat 21 and/or contact 12. The tip 30 is designed to maintain contact on two surfaces, including an interior wall of the moat 21, and the solder joint 15, as will be described with reference to FIG. 4b below. The tip 30 thus heats up the solder joint 15 and the metal around it. The axial hole 35 that forms the vacuum channel uses compressed air to assist in extracting the contact 12. The soldering tip 30 may be used with a 70-watt Edsyn 505 soldering station, for example, commonly used in assembly areas.

The extraction tool 31 (FIG. 4b) comprises a stainless steel tube 33 that holds the contact 12 because a slight pressure is needed to initiate movement of the contact 12 when desoldering it. The extraction tool 31 fits inside the central through hole 13 and over the contact pin 23 and is positioned from the inside of the housing 11 against the bottom of the contact 12, as will be described with reference to FIG. 4b below. A constant pressure is maintained outward while the solder joint 15 is heated. The extraction tool 31 is not required for installation of contacts 12.

Figure 4C:
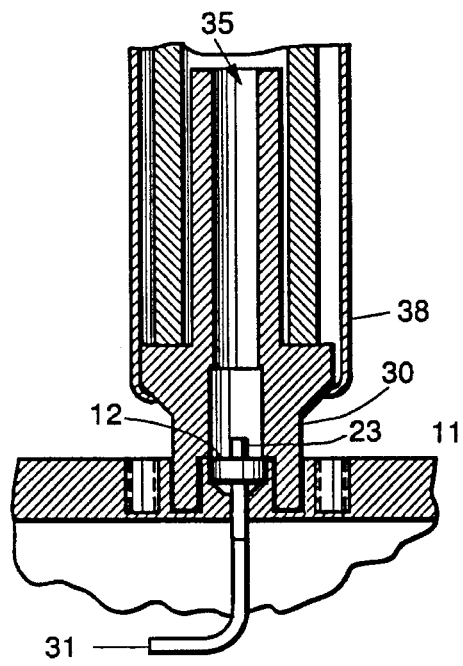
Figure 4D:
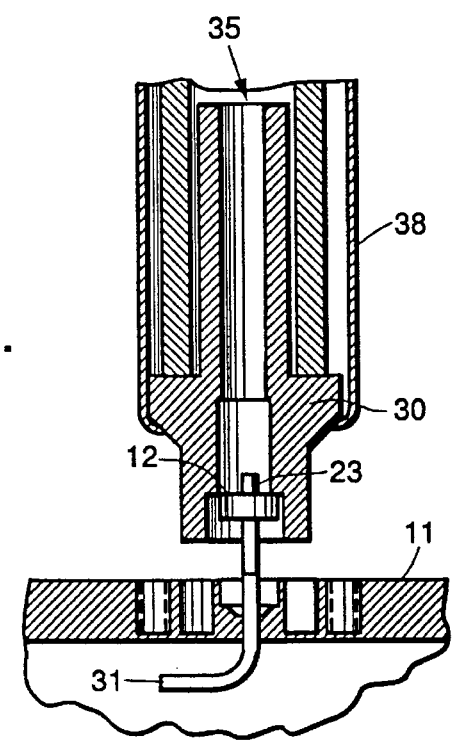
Figure 4E:
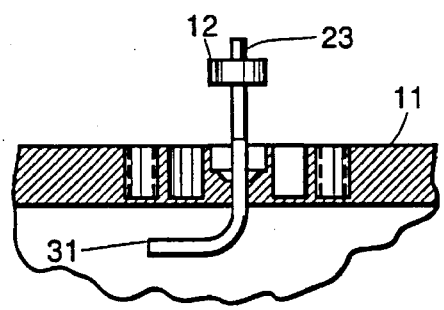
Figure 4F:
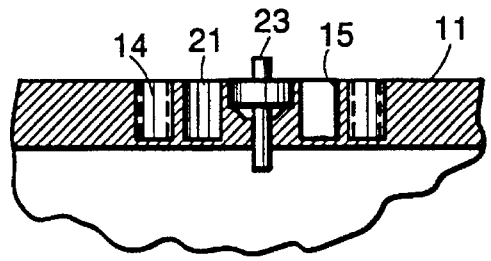

The removal or desoldering process 40 is illustrated with reference to FIGS. 4a–4f. Referring to FIG. 4a, the housing 11 is secured to a workbench, for example, to minimize movement during the process. At this time the soldering iron 38 is heated to approximately 825° C. using an Edsyn 505 soldering station, for example. The green light on the station begins to blink when the soldering iron 38 is at soldering temperature. The soldering iron 38 may be heated for another 2 minutes after the light blinks. The tip 30 is tinned with approximately 0.5 inch of Sn 63 solder, for example, and one drop of flux. Referring to FIG. 4b, the contact 12 is engaged from the rear using the extraction tool 31, one drop of flux is disposed 45 on the solder joint 15, and the soldering iron 38 is brought into contact with the contact 12. Referring to FIG. 4c, the soldering iron 38 is disposed in the moat 21 while outward pressure is exerted with the extraction tool 31. Referring to FIG. 4d, an approximately 2 to 3 second delay is made and as smoke begins to dissipate, the trigger on the grip of the soldering iron 38 is pulled to vacuum out 48 the contact 12, while the soldering iron 38 is simultaneously removed and the contact 12 is pushed out. Referring to FIG. 4e, the contact 12 is now desoldered and seated in the extraction tool 31. Referring to FIG. 4f, the contact 12 is removed from the extraction tool 31 and discarded, and the extraction tool 31 is removed from the housing 11.

Figure 5A:
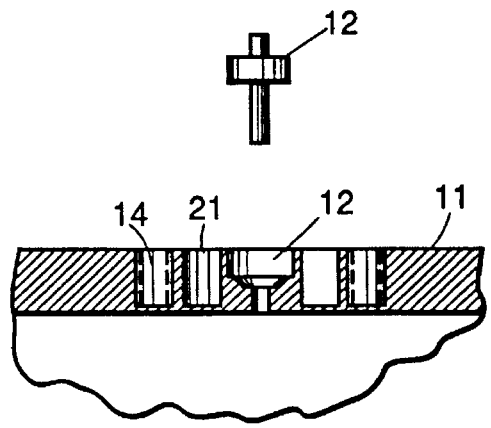
Figure 5B:
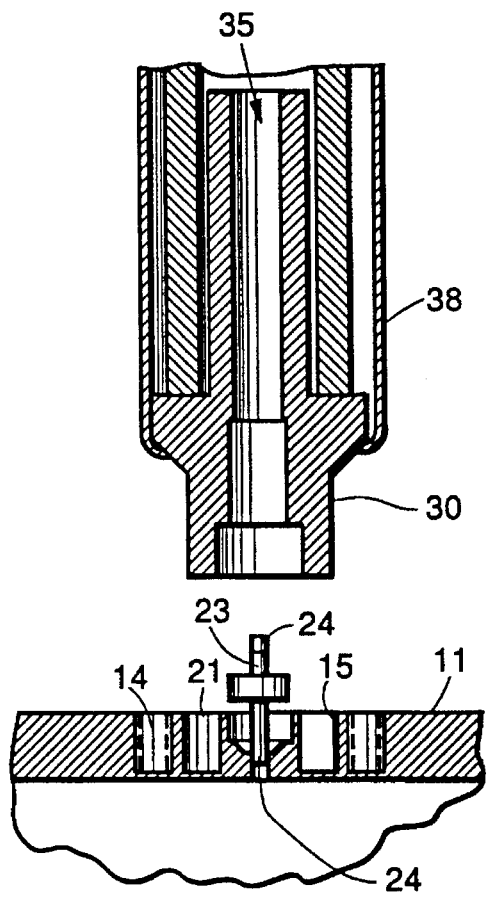

The present installation or soldering process is illustrated with reference to FIGS. 5a–5f. With reference to FIG. 5a, a new, unused, tinned contact 12 is prepared 61 for installation by surrounding the pin 23 with teflon sleeves 24. One drop of flux is disposed 62 in the central through hole 13 in the housing 11, and one drop is disposed 63 on the solder of the contact 12. With reference to FIG. 5b, the contact 12 is seated by inserting it 64 into the central through hole 13 until one teflon sleeve 24 is engaged in the thru hole 13. The soldering iron 38 is then prepared by heating it to 825° C. The green light on the station begins to blink when the iron is at soldering temperature. The soldering iron 38 is heated for another 2 minutes after the light blinks. The tip 30 is prepared by tinning it with approximately 0.5 inch of Sn 63 solder and one drop of flux. As shown in FIG. 5c, the soldering iron 38 is disposed 67 on the contact 12 and pressed into the housing 11. Referring to FIG. 5d, the contact is bottomed out and the soldering iron 38 is left on the joint 15 for approximately 1 to 2 seconds. As shown in FIG. 5e, the soldering iron 38 is removed and the joint 15 is examined. The solder joint 15 is touched up 71, if required. Referring to FIG. 5f, the solder joint 15 and housing 11 are cleaned prior to removing the sleeves 24.

Validation tests were set up in such a way that there were three variables involved in measuring the impact of the size of the thermal choke on the effectiveness of the present invention. The width and depth of the contact moat 21 were varied, as was the starting temperature of the housing 11. A size variable was used to assess the effect of thermal path alteration, while a temperature variable was used to measure the temperature gradient with respect to preheat or starting solder joint temperature. Each variable was mixed with the others in an assortment of combinations to provide for a good cross-section of samples, and a total of nine tests were run. Data is presented in the tables below. The tests were performed on test housings 11 that approximated worst case scenarios for actual hardware to ascertain realistic simulations.

| | SET-UP PARAMETERS | | |
|---|---|---|---|
| TEST # | STARTING HOUSING TEMP (C.) | LAND DIAMETER (In) | MOAT DEPTH (In) |
| 1 | 25 | .204 | .080 |
| 2 | 100 | .204 | .080 |
| 3 | 25 | .280 | .080 |
| 4 | 100 | .280 | .080 |
| 5 | 25 | .204 | .125 |
| 6 | 100 | .204 | .125 |
| 7 | 25 | .280 | .125 |
| 8 | 100 | .280 | .125 |
| 9 | 63 | .242 | .103 |

| | MEASURED DATA - REMOVAL | | | |
|---|---|---|---|---|
| TEST # | STARTING HOUSING TEMP (C.) | REFLOW TIME (sec) | FINAL SUBSTRATE TEMP (C.) | TEMPERATURE GRADIENT (C.) |
| 1 | 27 | 4 | 39 | 12 |
| 2 | 93 | 2 | 105 | 12 |
| | 29 | 8 | 35 | 6 |
| 4 | 100 | 3 | 108 | 8 |
| S | 27 | 5 | 35 | 8 |
| 6 | 96 | 3 | 106 | 10 |
| 7 | 25 | 6 | 38 | 13 |
| 8 | 99 | 5 | 110 | 11 |
| 9 | 65 | 2 | 75 | 10 |

| | MEASURED DATA - INSTALLATION | | | |
|---|---|---|---|---|
| TEST # | STARTING HOUSING TEMP (C.) | REFLOW TIME (sec) | FINAL SUBSTRATE TEMP (C.) | TEMPERATURE GRADIENT (C.) | HERMETICITY PASS FAIL |
| 1 | 27 | 5 | 31 | 4 | Pass |
| 2 | 98 | 3 | 106 | 8 | Pass |
| 3 | 30 | 5 | 38 | 8 | Pass |
| 4 | 101 | 9 | 120 | 19 | Pass |
| 5 | 26 | 3 | 36 | 10 | Pass |
| 6 | 97 | 2 | 107 | 10 | Pass |
| 7 | 29 | 5 | 34 | 5 | Pass |
| 8 | 100 | 1 | 109 | 9 | Pass |
| 9 | 65 | 2 | 76 | 11 | Fail |

Test results show that all but one reinstalled contact passed the initial hermeticity test. Although the solder joints 15 appeared grainy on the surface under a microscope, the hermeticity test revealed no leaks. The temperature gradient also seemed to be consistently in the 5° to 15° C. range, which indicates that, regardless of the preheat condition, the temperature will elevate about an equal amount, and as such, there was virtually no difference in the reflow time. Although the different moat configurations are believed to have been a factor in the readings, it has not proven to be dominant. The thermal choke proved to be very effective in reducing the thermal path to a point where the rate of heat transfer out of the solder joint 15 became insignificant compared to that which was inbound to the solder joint 15. Consequently the temperature of the solder joint 15 elevated very efficiently without much heat loss to the surroundings.

Thus there has been described new and improved apparatus and methods for installing and removing insulator-encapsulated contacts employed in such microwave integrated circuits. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A process for desoldering an insulator-encapsulated contact secured in a housing 11, said process comprising the steps of:

securing the housing to minimize movement of the housing;

heating a soldering iron to approximately 825° C.;

tinning the tip of the soldering iron with solder and flux;

engaging the contact from the rear using an extraction tool;

disposing flux on a solder joint between the housing and the contact;

disposing the soldering iron in contact with the contact;

disposing the soldering iron in moat while outward pressure is exerted with an extraction tool;

after a predetermined delay, vacuuming out the contact using the extraction tool, while simultaneously removing the soldering iron and pushing out the contact, whereafter the contact is desoldered and seated in the extraction tool; and removing the contact from the extraction tool and removing the tool from the housing.

2. The process of claim 1 wherein the step of tinning the tip of the soldering iron comprises the step of tinning it with approximately 0.5 inch of Sn 63 solder, and one drop of flux.

3. The process of claim 1 wherein the predetermined delay comprises a delay of from 2 to 3 seconds.

4. A process for soldering an insulator-encapsulated contact into a housing, said process comprising the steps of:

preparing a tinned contact for installation by surrounding its contact pin with teflon sleeves;

disposing flux in a central through hole in the housing;

disposing flux on the solder of the contact;

inserting the contact into the central through hole until one teflon sleeve is engaged therein;

heating a soldering iron to approximately 825° C.;

tinning the tip of the soldering iron with solder and flux;

disposing the soldering iron on the contact and pressing it into the housing;

bottoming out the contact and leaving the soldering iron on the solder joint for a predetermined time period;

removing the soldering iron and examining the solder joint; and cleaning the solder joint and housing and removing the sleeves.

5. The process of claim 4 wherein the step of preparing the tip of the soldering iron comprises tinning it with approximately 0.5 inch of Sn 63 solder, and one drop of flux.

6. The process of claim 4 wherein the predetermined delay comprises a delay of from 2 to 3 seconds.

7. The process of claim 4 wherein the step of leaving the soldering iron on the solder joint for a predetermined time period comprises leaving the soldering iron on the solder joint for approximately 1 to 2 seconds.

8. The process of claim 4 further comprising the step of, after removing the soldering iron and examining the solder joint, reheating the solder joint, as required.

* * * * *